United States Patent
Chien

(10) Patent No.: US 9,349,117 B2
(45) Date of Patent: May 24, 2016

(54) INTEGRATION METHOD AND ELECTRONIC DEVICE

(75) Inventor: Jui-Ting Chien, New Taipei (TW)

(73) Assignee: Wistron Corporation, New Taipei (TW)

( * ) Notice: Subject to any disclaimer, the term of this patent is extended or adjusted under 35 U.S.C. 154(b) by 199 days.

(21) Appl. No.: 13/548,220

(22) Filed: Jul. 13, 2012

(65) Prior Publication Data

US 2014/0017656 A1 Jan. 16, 2014

(51) Int. Cl.
G06Q 10/10 (2012.01)
H04L 12/933 (2013.01)
H01M 10/42 (2006.01)
G09B 5/00 (2006.01)

(52) U.S. Cl.
CPC *G06Q 10/10* (2013.01); *G09B 5/00* (2013.01); *H01M 10/425* (2013.01); *H04L 49/15* (2013.01)

(58) Field of Classification Search
CPC .............................. H04L 49/15; H01M 10/425
USPC ........................................................ 434/365
See application file for complete search history.

(56) References Cited

U.S. PATENT DOCUMENTS

| | | | |
|---|---|---|---|
| 2003/0198936 A1 | 10/2003 | Wen et al. | |
| 2003/0232318 A1* | 12/2003 | Altenhofen | G09B 7/00 434/362 |
| 2004/0153509 A1* | 8/2004 | Alcorn et al. | 709/205 |
| 2009/0136910 A1* | 5/2009 | Mayost et al. | 434/350 |
| 2009/0317786 A1* | 12/2009 | Alcorn et al. | 434/323 |
| 2010/0279264 A1* | 11/2010 | Barazanji | 434/322 |
| 2011/0151422 A1* | 6/2011 | Sumrall et al. | 434/322 |
| 2011/0212430 A1* | 9/2011 | Smithmier et al. | 434/322 |
| 2012/0322041 A1* | 12/2012 | Weisman | 434/308 |
| 2013/0196307 A1* | 8/2013 | Estrada et al. | 434/430 |

\* cited by examiner

*Primary Examiner* — Sam Yao
*Assistant Examiner* — Thomas Hong
(74) *Attorney, Agent, or Firm* — Jianq Chyun IP Office

(57) ABSTRACT

The invention provides an integration method for an electronic device having a display and an integrated database storing learning data corresponding to an individual. The display displays an operative frame having icons representing categories respectively and each of the learning data is associated to at least one of the categories. The method comprises displaying a first set of learning data associated to one of the categories at the operative frame and receiving a first signal. When the first signal is for selecting one of the icons representing another one category, a second set of learning data associated to another one category is displayed at operative frame. When the first signal is for selecting one datum among the displayed first set of learning data, a third set of learning data is displayed at the operative frame, wherein the third set of learning data is related to the selected datum.

12 Claims, 8 Drawing Sheets

INTEGRATION METHOD AND ELECTRONIC DEVICE

BACKGROUND OF THE INVENTION

1. Field of Invention

The present invention relates to an integration method and an electronic device. More particularly, the present invention relates to an integration method using on an electronic schoolbag.

2. Description of Related Art

Because of the advantages of light weight and small size, portable electronic devices such as smart phones or tablets are widely used in human daily life. In order to provide the students and parents a more convenient way to access the learning information from school, the portable devices are used as schoolbag to records various information such as course agenda, school schedule and homework and even to provide a teacher-parent communication platform thereon.

However, the information or the data are published or provided by different departments of the school. That is, different information or data platforms provide various information and data. Accordingly, in the electronic schoolbag, different applications are designed to receive the specific information and data to provide different functions. Hence, the user needs to familiar with the functions of different applications and switches between the applications in order to obtain the information or data he/she needs. Thus, the operation convenience is decreased.

SUMMARY OF THE INVENTION

Accordingly, the present invention provides an integration method for the user to intuitively operate the electronic device.

The invention also provides an electronic device capable of increasing the operation efficiency of the electronic device.

The invention further provides a learning system capable of simplifying the operation steps of the electronic device.

The invention provides an integration method adopted by an electronic device having a display and an integrated database storing a plurality of learning data corresponding to an individual. The display displays an operative frame having a plurality of icons representing a plurality of categories respectively, each of the learning data is associated to at least one of the categories and a portion of the learning data are related to one another. The method comprises displaying a first set of learning data associated to one of the categories at a main displaying region of the operative frame and receiving a first signal. When the first signal is for selecting one of the icons representing another one category, a second set of learning data associated to another one category is displayed at the main displaying region of operative frame. When the first signal is for selecting one datum among the displayed first set of learning data, a third set of learning data is displayed at the main displaying region of the operative frame, wherein the third set of learning data is related to the selected datum.

The invention also provides an electronic device. The electronic device comprises a display, a storage device and a processing unit. The display displays an operative frame having a plurality of icons representing a plurality of categories respectively. The storage device stores an integrated database and a computer readable and writable program, wherein the integrated database stores a plurality of learning data corresponding to an individual, each of the learning data is associated to at least one of the categories and a portion of the learning data are related to one another. The processing unit is coupled to the display and the storage device and executes a plurality of instructions of the computer readable and writable program. The instructions comprise controlling the display to display a first set of learning data associated to one of the categories at a main displaying region of the operative frame receiving a first signal. When the first signal is for selecting one of the icons representing another one category, the display is controlled to display a second set of learning data associated to another one category at the main displaying region of operative frame. When the first signal is for selecting one datum among the displayed first set of learning data, the display is controlled to display a third set of learning data at the main displaying region of the operative frame, wherein the third set of learning data is related to the selected datum.

The invention further provides a learning system. The learning system comprises a management server and at least an electronic device. The management server has a school database storing a plurality of school data. Each of the electronic devices comprises a display module, a data module and a control module. The display module displays an operative frame having a plurality of icons representing a plurality of categories respectively and also displays a first set of learning data associated to one of the categories at a main displaying region of the operative frame. The data module maintains an integrated database, wherein the integrated database stores a plurality of learning data corresponding to an individual, each of the learning data is associated to at least one of the categories and a portion of the learning data are related to one another. The control module is coupled to the display module and the data module, wherein the control module receives a first signal. When the first signal is for selecting one of the icons representing another one category, the control module controls the display module to display a second set of learning data associated to another one category at the main displaying region of operative frame. When the first signal is for selecting one datum among the displayed first set of learning data, the control module controls the display module to display a third set of learning data at the main displaying region of the operative frame, wherein the third set of learning data is related to the selected datum.

According to one embodiment of the present invention, the categories include a school calendar, a course table, a communication book and a subject.

According to one embodiment of the present invention, when the category is the subject, the learning data associated to the subject include a plurality of subject material files and the learning data related to each of the subject material files include content of the subject material file.

According to one embodiment of the present invention, when the category is the school calendar, the learning data associated to the school calendar include a plurality of monthly school calendars and the learning data related to each of the monthly school calendars include a plurality of daily schedules, a plurality of courses, a plurality of subject material files related to each of the courses and a content of each of the subject material file.

According to one embodiment of the present invention, when the category is the communication book, the learning data associated to the communication book include homework lists and messages. The learning data related to each of the homework lists include a plurality of homework files and the learning data related to each of the messages include content of the message.

According to one embodiment of the present invention, when the category is the course table, the learning data associated to the course table include a plurality of weekly course tables and the learning data related to each of the weekly course tables include a plurality of courses, a plurality of subject material files related to each of the courses and a content of each of the subject material file.

According to one embodiment of the present invention, the integration method further comprises connecting the electronic device to a management server through Internet and logging in the management server with an identification of the individual, wherein the management server has a school database. The integrated database of the electronic device is synchronized with the school database according to the identification of the individual and the operative frame is displayed.

According to one embodiment of the present invention, the step of synchronizing the integrated database with the school database further comprises according to the identification of the individual, retrieving a plurality of school data corresponding to the individual from the school database and updating the learning data in the integrated database with the retrieved school data.

According to one embodiment of the present invention, the step of displaying the operative frame further comprises, according to a current time, displaying the learning data corresponding to the current time at the main displaying region of the operative frame.

According to one embodiment of the present invention, the integration method further comprises connecting the electronic device to a management server through Internet and logging in the management server with an identification of the individual, wherein the management server has a school database. When there is no learning data in the integrated database, a plurality of school data corresponding to the individual is downloaded from the school database according to the identification of the individual into the integrated database. The downloaded school data is analyzed so as to associate each of the downloaded school data to at least one of the categories and so as to determine a portion of the downloaded school data to be correlated with one another. The operative frame is displayed.

According to one embodiment of the present invention, the operative frame further has at least a tool icon representing an available application and when the first signal is for selecting one of the tool icon, the available application corresponding to the selected tool icon is launched.

In the present invention, an electronic device possesses an integrated database integrating the learning data corresponding to an individual and obtained from the school information providing platform maintained by the school authority. Because of the integrated database, the user can intuitively operates the electronic device to obtain any kind of the information or materials related to the school life and study. Thus, the operation of the electronic device is simplified and the operation efficiency is increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the present invention, an electronic device which is used as an electronic schoolbag is illustrated. The electronic device possesses an integrated database integrating the learning data corresponding to an individual and obtained from the school information providing platform maintained by the school authority. Because of the integrated database, the user can intuitively operates the electronic device to obtain any kind of the information or materials related to the school life and study. That is, the data categories which are retrieved from different databases in the school information-providing platform are interrelated to each other in the integrated database and the user can switch the data between different data categories without bothering to dig out the data from the database by following complex storage paths. In the following paragraphs, several exemplary embodiments accompanied with the figures are introduced to further describe the present invention.

Figure 1:
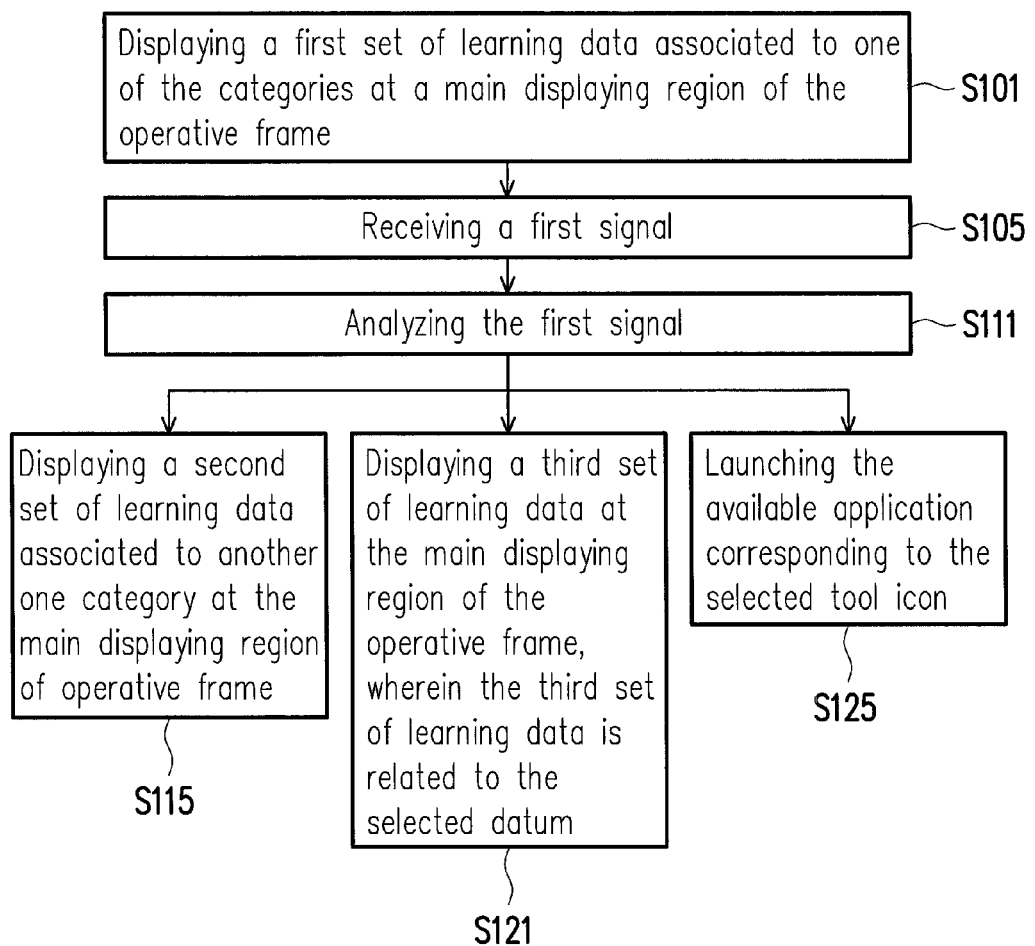
FIG. 1 is a flow chart illustrating an integration method according to one embodiment of the present invention.

The FIG. 1 is a flow chart illustrating an integration method according to one embodiment of the present invention. In the present embodiment, the electronic device implementing an integration method of the present invention comprises a display and an integrated database. The electronic device can be, for example, a personal computer, a laptop or a portable device such as a smart phone, a personal digital assistant (PDA), tablet or any electronic device having a display. Furthermore, the integrated database stores a plurality of learning data corresponding to an individual.

Figure 1A:
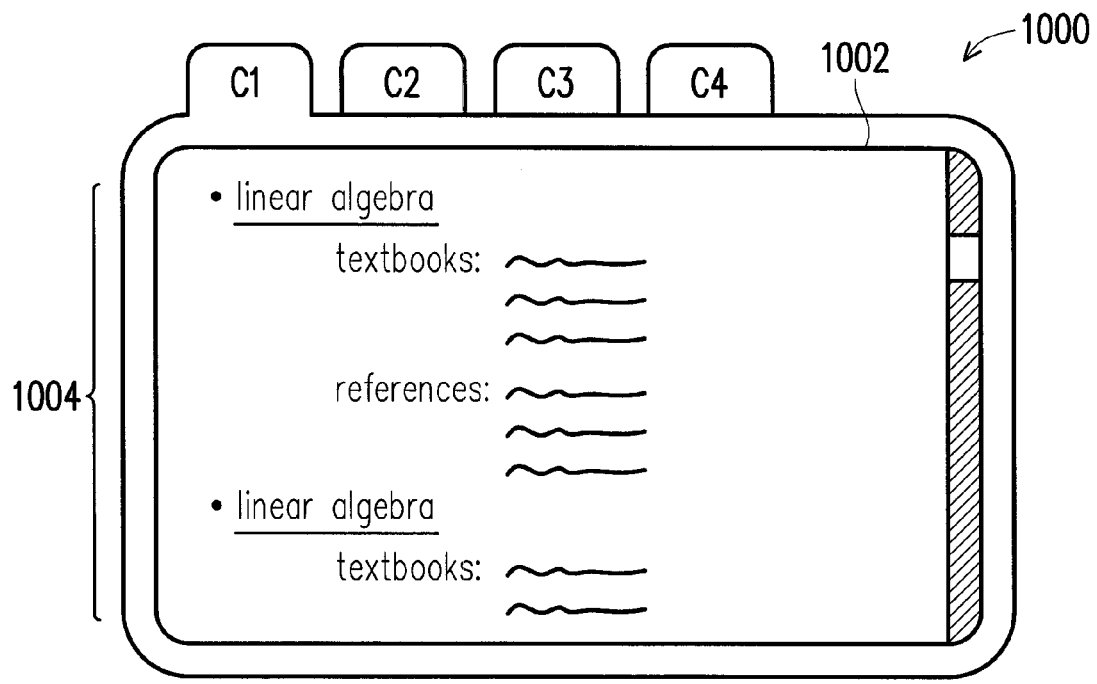
FIG. 1A is a schematic drawing showing a user interface shown by an electronic device implementing the integration method according to one embodiment of the present invention.

FIG. 1A is a schematic drawing showing a user interface shown by an electronic device implementing the integration method according to one embodiment of the present invention. In addition, as shown in FIG. 1A, the display displays an operative frame (the user interface) 1000 having a plurality of icons (including icons C1, C2, C3 and C4) representing a plurality of categories respectively and each of the learning data is associated to at least one of the categories and a portion of the learning data are related to one another. Moreover, in the integrated database, the categories can include, for example but not limited to, a school calendar, a course table, a communication book and a subject. Moreover, the operative frame further has at least a tool icon representing an available application and when the first signal is for selecting one of the tool icons, the available application corresponding to the selected tool icon is launched.

Figure 2:
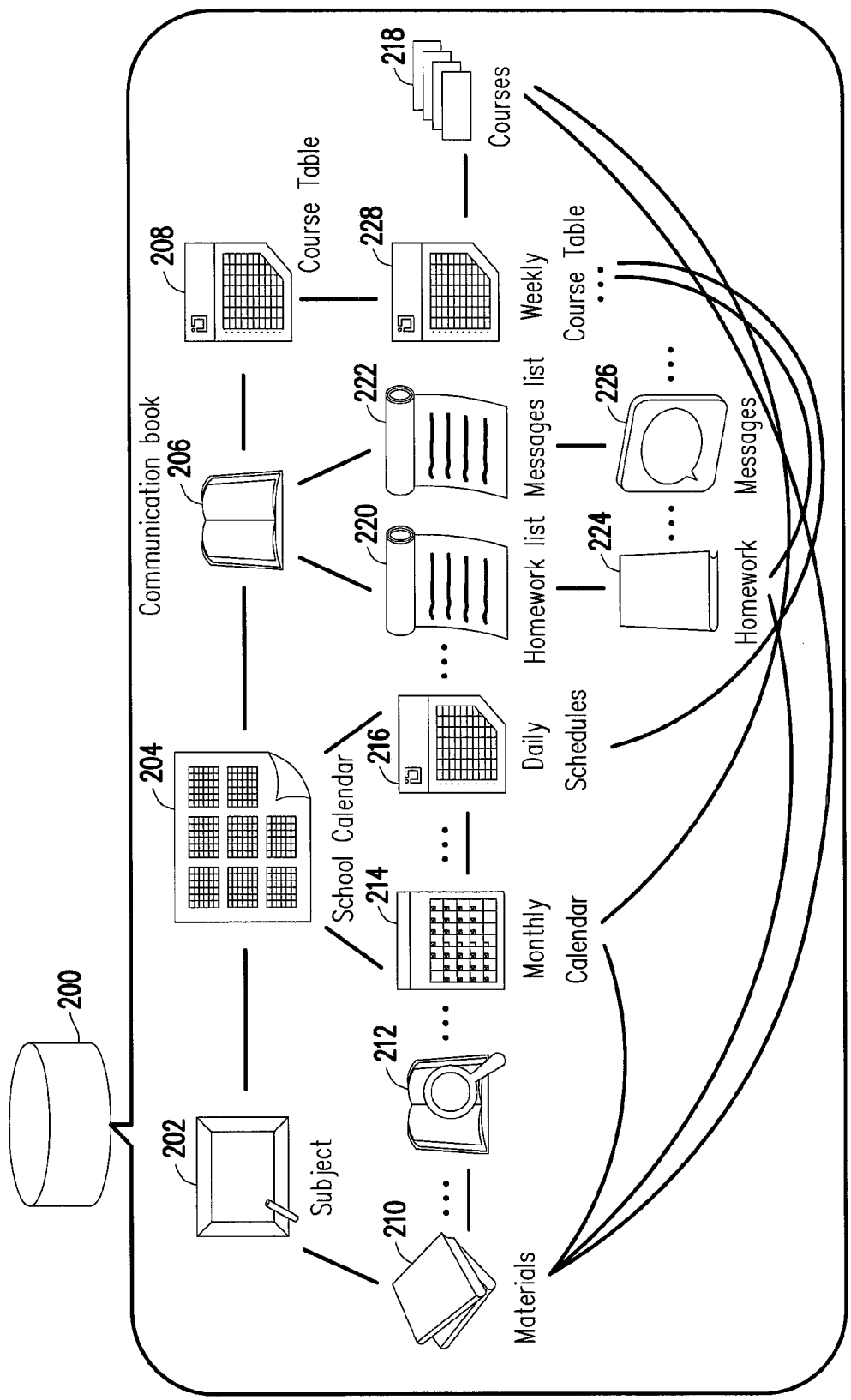
FIG. 2 is a schematic drawing showing data relationships in the integrated database according to one embodiment of the present invention.

Furthermore, FIG. 2 is a schematic drawing showing data relationships in the integrated database according to one embodiment of the present invention. As shown in FIG. 2, in the integrated database 200, as for the subject category 202, the learning data associated to the subject category 202 include a plurality of subject material files 210 and the learning data related to each of the subject material files include content 212 of the subject material file 210. It should be noticed that each of the courses taken by the individual in the present semester may contain several subjects and different courses may involve the same subjects or related subjects.

In addition, as for the school calendar category 204, the learning data associated to the school calendar category 204 include a plurality of monthly school calendars 214 and the learning data related to each of the monthly school calendars include a plurality of daily schedules 216, a plurality of courses 218, the subject material files 210 related to each of the courses 218 and the contents 212 of the subject material files 210.

Further, as for the communication book category 206, the learning data associated to the communication book include homework lists 220 and messages 222. Also, the learning data related to each of the homework lists include a plurality of homework files 224 and the learning data related to each of the messages include content 226 of the message. Further, the learning data related to each of the homework files include a plurality of weekly course tables 228, subject material files 210 and contents 212 of the subject material files 210.

Moreover, as for the course table category, the learning data associated to the course table include the weekly course tables 228 and the learning data related to each of the weekly course tables 228 include the daily schedules 216, the courses 218, the subject material files 210 related to each of the courses 218 and the contents 212 of the subject material files 210.

As shown in FIG. 2, the relationship lines between the learning data also represent the operation connections respectively. That is, for the two learning data having operation connection between each other, the user can quickly switch the frame for showing one learning data to the other frame for showing the other learning data. In other words, the learning data associated to different categories are related to one another so that the categories are no longer isolated from each other.

As shown in FIG. 1, FIG. 1A and FIG. 2, in the step S101, the display of the electronic device displays a first set of learning data associated to one of the categories at a main displaying region 1002 of the operative frame 1000. For instance, as shown in FIG. 1A, the icon C1 representing the subject category is taken as an exemplary embodiment. Hence, the main display region 1002 displays a first set of the learning data associated to the subject category. That is, the subject material files 1004 which are the first set of the learning date associated to the subject category are shown in the main displaying region 1002 and include the textbooks and the references for the subject of linear algebra and the textbooks and references for the subject of geometry.

Figure 1B:
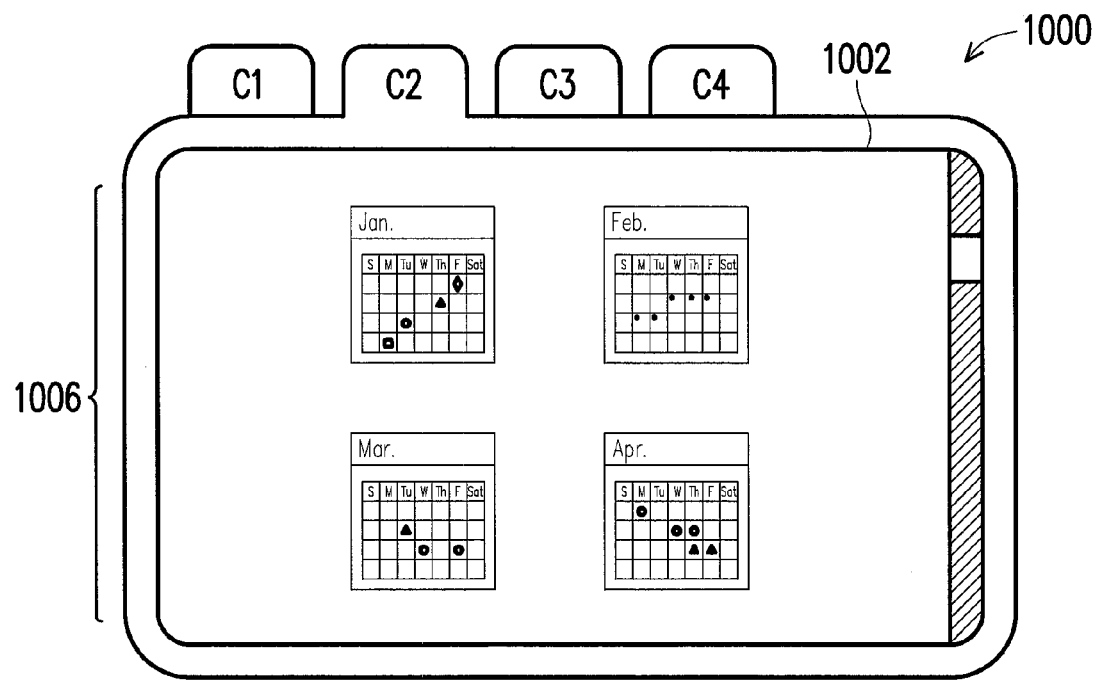
FIG. 1B is a schematic drawing showing a user interface shown by an electronic device implementing the integration method according to another embodiment of the present invention.

As shown in FIG. 1, the electronic device receives a first signal (step S105) and further analyzes the first signal (step S111). When the first signal is for selecting one of the icons representing another one category, the display displays a second set of learning data associated to another one category at the main displaying region of operative frame (step S115). FIG. 1B is a schematic drawing showing a user interface shown by an electronic device implementing the integration method according to another embodiment of the present invention. In FIG. 1B, the icon C2 representing the school calendar category is taken as an exemplary embodiment. For instance, as shown in FIG. 1A and FIG. 1B, when the first signal is for selecting the icon C2 representing the school calendar, the main display region 1002 is switched to show the second set of learning data associated to the school calendar category. That is, the main display region 1002 is switch to show the frame having a plurality of monthly school calendars 1006 from the frame having the subject material files 1004. In other words, under the same operative frame, the main display region 1002 can be quickly switched to show the leaning data associated to different categories.

Figure 1C:
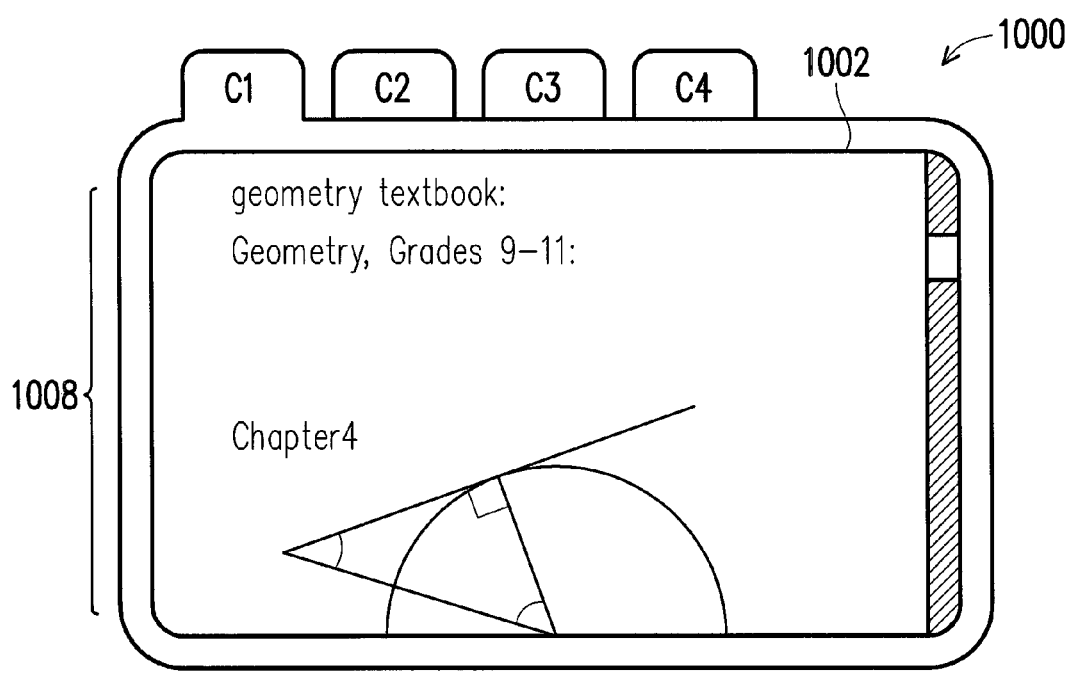
FIG. 1C is a schematic drawing showing a user interface shown by an electronic device implementing the integration method according to the other embodiment of the present invention.

Furthermore, when the first signal is for selecting one datum among the displayed first set of learning data, the display displays a third set of learning data at the main displaying region 1002 of the operative frame, wherein the third set of learning data is related to the selected datum (step S121). FIG. 1C is a schematic drawing showing a user interface shown by an electronic device implementing the integration method according to the other embodiment of the present invention. In FIG. 1C, the icon C1 representing the subject category is taken as an exemplary embodiment. For instance, as shown in FIG. 1A and FIG. 1C, when the first signal is for selecting a textbook information among the first set of learning data which are the subject material files 1004, the main displaying region 1002 is switched to show the content of the subject material file which may include the content 1008 of the textbook. More clearly, in FIG. 1C, upon the first signal selecting the textbook of geometry, the main displaying region 1002 displays chapter 4 of the geometry text book, "Geometry, Grades 9-11".

Figure 3:
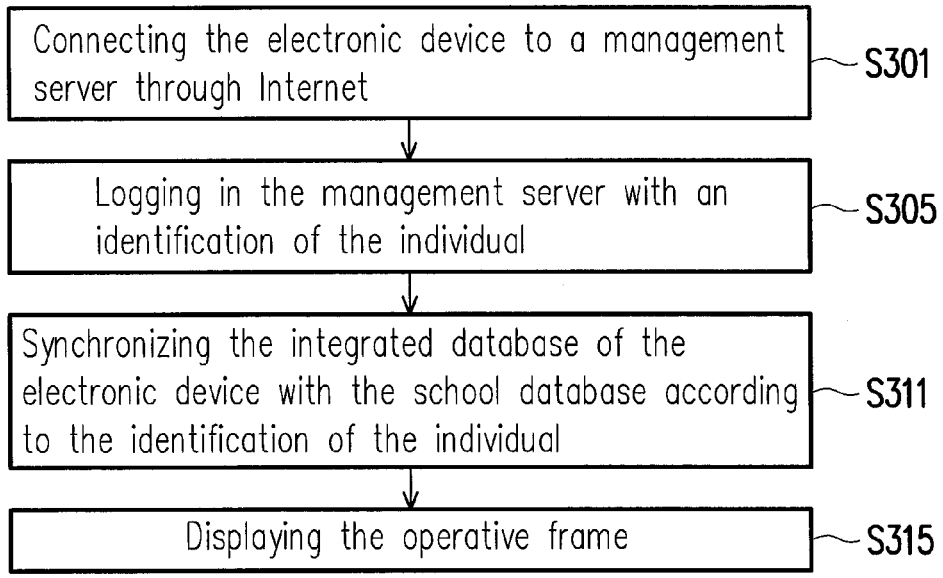
FIG. 3 is a flow chart showing the steps for transferring data from a management server according to one embodiment of the present invention.

In the present invention, the learning data corresponding to the individual and stored the integrated database of the electronic device are obtained from a management server maintained by an authority such as school authority. The management server comprises a school database storing various data related to the student education, activities and life in the school. The data stored in the school database, for example, belongs to different data platforms representing different topics respectively in the school database. In the present invention, the integration database can be manually or automatically synchronized with the school database in anytime during the integration method of the present invention is implemented by the electronic device. That is, the learning data can be obtain from the school database or the integrated database can be updated at the initial step of launching a program for implementing the integration method of the present invention by the electronic device or after the step of displaying the operative frame on the display (the step S101). Moreover, the learning data obtained from the school database are further analyzed and integrated in the integrated database of the electronic device. FIG. 3 is a flow chart showing the steps for transferring data from a management server according to one embodiment of the present invention. As shown in FIG. 3, in the step S301, the electronic device is connected to the management server through the Internet. In the step S305, the electronic device logs in the management server with an identification of the individual.

In the step S311, the integrated database of the electronic device is synchronized with the school database according to the identification of the individual. That is, only the learning data corresponding to the identification of the individual in the school database are used to synchronize the learning data in the integrated database. In the step S315, the display of the electronic device displays the operative frame. In one embodiment, according to a current time, the operative frame is displayed with the learning data shown at the main displaying region of the operative frame and the learning data shown in the operative frame corresponds to the current time. In other words, after the integrated database of the electronic device is synchronized with the school database, the electronic device displays the operative frame with the learning data such as today's daily schedule or the current weekly course table with the highlighted courses of today.

Figure 3A:
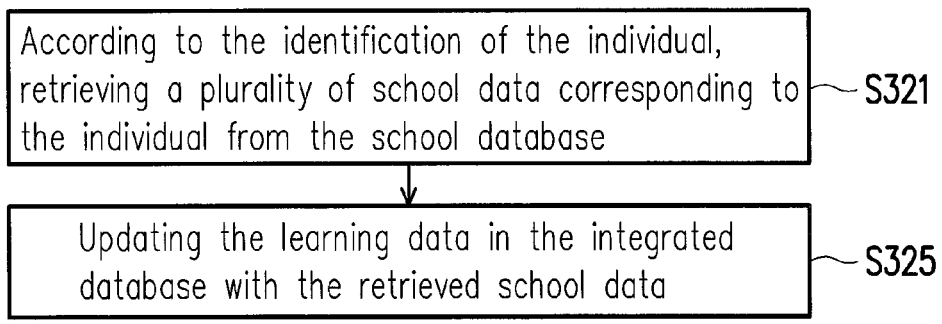
FIG. 3A is a flow chart showing the steps for updating data stored in an integrated database according to one embodiment of the present invention.

FIG. 3A is a flow chart showing the steps for updating data stored in an integrated database according to one embodiment of the present invention. In another embodiment, as shown in FIG. 3A, the step S311 of synchronizing the integrated database with the school database further comprises, according to the identification of the individual, retrieving a plurality of school data from the school database corresponding to the individual (step S321) and updating the learning data in the integrated database with the retrieved school data (step S325).

Figure 4:
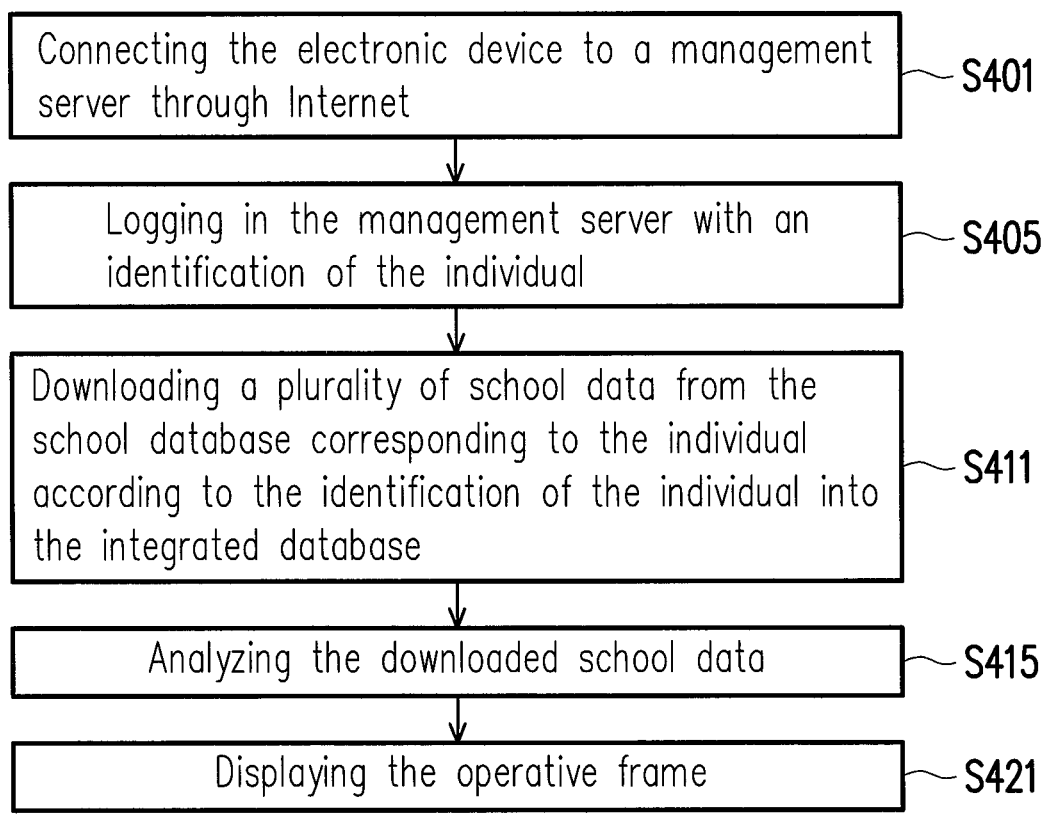
FIG. 4 is a flow chart showing the steps for storing data in the integrated database while no data is stored in the integrated database beforehand according to one embodiment of the present invention.

FIG. 4 is a flow chart showing the steps for storing data in the integrated database while no data is stored in the integrated database beforehand according to one embodiment of the present invention. As shown in FIG. 4, in the other embodiment, the electronic device is connected to the management server maintained by the authority through Internet (step S401) and logs in the management server with an identification of the individual (step S405). Also, when there is no learning data in the integrated database, a plurality of school data corresponding to the individual is downloaded from the school database according to the identification of the individual and is stored into the integrated database (step S411). Then, the downloaded school data is analyzed so as to associate each of the downloaded school data to at least one of the categories and so as to determine a portion of the downloaded school data to be correlated with one another (step S415) and the display of the electronic device displays the operative frame (step S421). Further, in one embodiment similarly to the one previously mentioned above, according to a current time, the operative frame is displayed with the learning data shown at the main displaying region of the operative frame and the learning data shown in the operative frame corresponds to the current time. In other words, after the integrated database of the electronic device is synchronized with the school database, the electronic device displays the operative frame with the learning data such as today's daily schedule or the current weekly course table with the highlighted courses of today.

Figure 5:
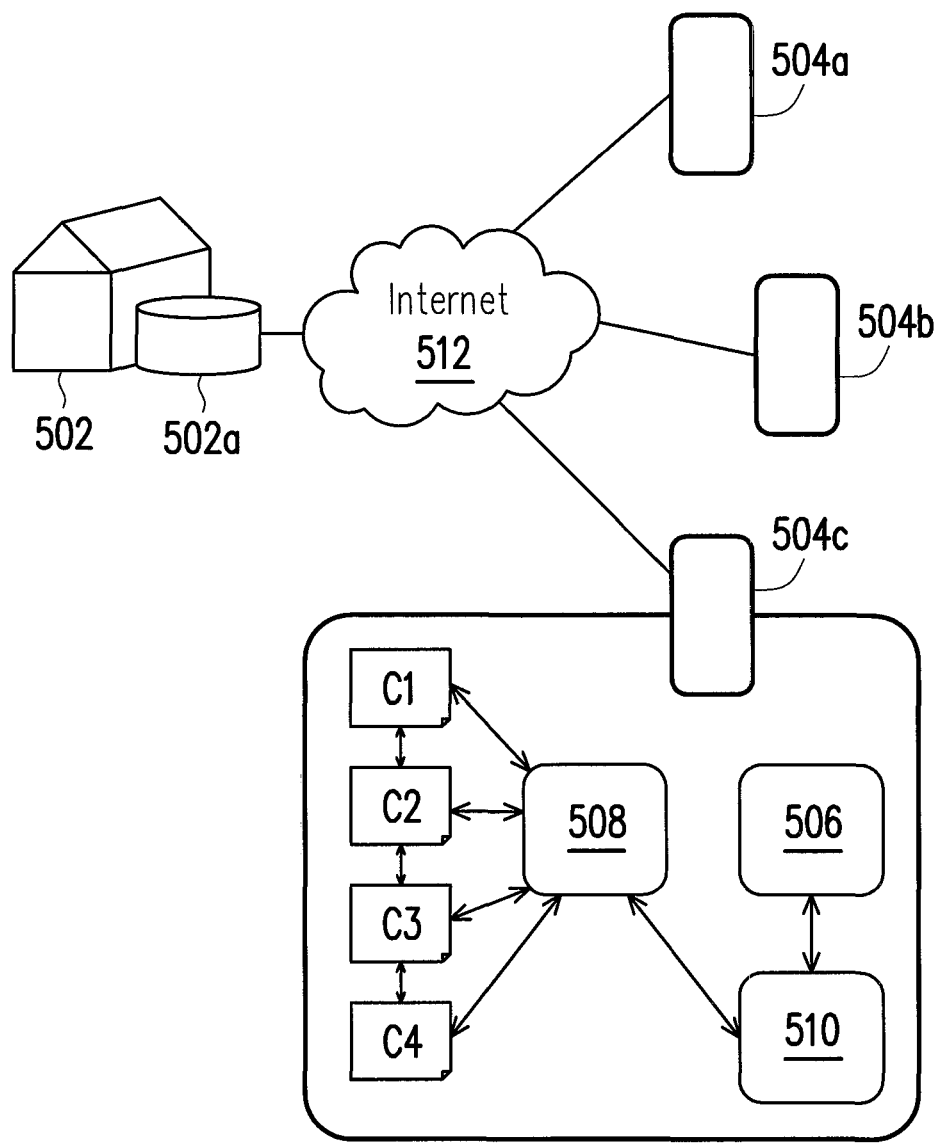
FIG. 5 is a schematic drawing showing a learning system according to one embodiment of the present invention.

FIG. 5 is a schematic drawing showing a learning system according to one embodiment of the present invention. In the present embodiment, a learning system implementing the integration method of the present invention is illustrated. As shown in FIG. 5, the learning system 500 comprises a management server 502 and at least one electronic device (including electronic devices 504a, 504b and 504c). The management server 502 has a school database 502a storing a plurality of school data and is maintained by an authority such as the school authority. Each of the electronic devices comprises a display module 506, a data module 508 and a control module 510. The display module 506 displays an operative frame having a plurality of icons representing a plurality of categories respectively and displaying a first set of learning data associated to one of the categories at a main displaying region of the operative frame. The data module 508 maintains an integrated database and the integrated database stores a plurality of learning data corresponding to an individual. Each of the learning data is associated to at least one of the categories (including categories C1, C2, C3 and C4) and a portion of the learning data are related to one another. In the embodiment shown in FIG. 5, the learning data stored in the integrated database are similar to the learning data mentioned in the previous embodiment and are not detailed herein. The control module 510 is coupled to the display module 506 and the data module 508. Furthermore, the control module 510 receives a first signal. When the first signal is for selecting one of the icons representing another one category, the control module 510 controls the display module 506 to display a second set of learning data associated to another one category at the main displaying region of operative frame. Furthermore, when the first signal is for selecting one datum among the displayed first set of learning data, the control module 510 controls the display module 506 to display a third set of learning data at the main displaying region of the operative frame, wherein the third set of learning data is related to the selected datum. Moreover, the operative frame further has at least a tool icon representing an available application and when the first signal is for selecting one of the tool icons, the control module 510 launches the available application corresponding to the selected tool icon.

In addition, for each of the electronic device, the control module 510 connects to the management server 502 through internet 512, logs in the management server 502 with an identification of the individual, controls the data module 508 to synchronize the integrated database of the electronic device with the school database according to the identification of the individual and controls the display module 506 to display the operative frame. In one embodiment, the control module 510 further controls the display module 506 to display the operative frame with the learning data corresponding to the current time at the main displaying region of the operative frame.

Moreover, during the data module 508 synchronizes the integrated database of the electronic device with the school database 502a, according to the identification of the individual, the control module 510 retrieves a plurality of school data corresponding to the individual from the school database 502a. Further, the data module 508 updates the learning data in the integrated database with the retrieved school data.

In another embodiment, for each of the electronic devices, the control module 510 connects to the management server 502 through Internet 512 and logs in the management server 502 with an identification of the individual. When there is no learning data in the integrated database, the control module 510 downloads a plurality of school data corresponding to the individual from the school database according to the identification of the individual and stored the downloaded school data into the integrated database. Moreover, the data module 508 analyzes the downloaded school data so as to associate each of the downloaded school data to at least one of the categories and so as to determine a portion of the downloaded school data to be correlated with one another.

Figure 6:
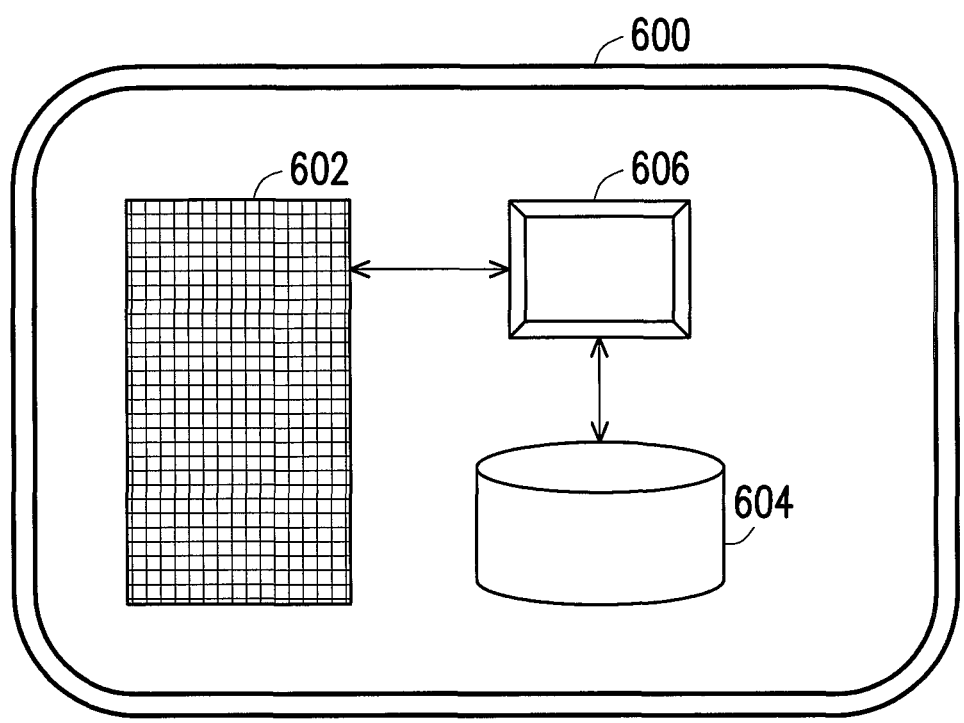
FIG. 6 is a schematic drawing showing an electronic device according to one embodiment of the present invention.

The integration method described in the previous embodiment can be implemented by an electronic device executing a computer readable and writable program. FIG. 6 is a schematic drawing showing an electronic device according to one embodiment of the present invention. As shown in FIG. 6, the electronic device 600 comprises a display 602, a storage device 604 and a processing unit 606. The display 602 displays the operative frame. The storage device 604 stores the integrated database and a computer readable and writable program. The functions of the display 602 and the integrated database and the data structure of the integrated database are similar to those illustrated in the previous embodiments and are not further detailed herein. The processing unit is coupled to the display and the storage device and executes a plurality of instructions of the computer readable and writable program. The instructions of the computer readable and writable program include displaying the learning data set at the main displaying region of the operative frame according to the received first signal (steps S105~S125), updating the learning data (steps S301~S325) and storing learning data when there is not learning data in the integrated database (steps S401~S421). The aforementioned steps are described in the previous embodiments and are not detailed herein.

In the present invention, an electronic device possesses an integrated database integrating the learning data corresponding to an individual and obtained from the school information providing platform maintained by the school authority. Because of the integrated database, the user can intuitively operates the electronic device to obtain any kind of the information or materials related to the school life and study. Thus, the operation of the electronic device is simplified and the operation efficiency is increased.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. An integration method adopted by a schoolbag integrated with an electronic device having a processing unit, a display and a storage device having an integrated database storing a plurality of learning data corresponding to an individual, wherein the display displays an operative frame having a plurality of icons representing a plurality of categories respectively, each of the learning data is associated to at least one of the categories and a portion of the learning data are related to one another, the processing unit implementing the method comprising:

displaying a first set of learning data associated to one of the categories at a main displaying region of the operative frame by the display;

the schoolbag receiving a first signal through a receiver in a control module in response to selecting one of the icons of the operative frame by the electronic device;

when the first signal is for selecting one of the icons representing another one category, switching the operative frame for displaying the first set of learning data to another operative frame for displaying a second set of learning data associated to said another one category at the main displaying region of said another operative frame; and when the first signal is for selecting one datum among the displayed first set of learning data, displaying a third set of learning data at the main displaying region of the operative frame, wherein the third set of learning data is related to the selected datum, connecting the schoolbag to a management server through Internet and logging in the management server with an identification of the individual, wherein the management server has a school database;

automatically synchronizing the integrated database in a data module of the schoolbag with the school database according to the identification of the individual by the control module controlling of the electronic device;

when there is no learning data in the integrated database, downloading a plurality of school data corresponding to the individual from the school database according to the identification of the individual into the integrated database;

analyzing the downloaded school data so as to associate each of the downloaded school data to at least one of the categories and so as to determine an operation connection between a portion of the downloaded school data and another portion of the downloaded school data; and displaying the operative frame, wherein the learning data of the first set of learning data associated to one of sub-categories of the one of the categories has an operation connection with the learning data of the second set of learning data associated to one of sub-categories of said another one category;

wherein the categories include a school calendar, a course table, a communication book and a subject;

wherein when the category of the plurality of categories is the subject, the learning data associated to the subject include a plurality of subject material files and the learning data related to each of the subject material files include content of the subject material file;

wherein when the category of the plurality of categories is the school calendar, the learning data associated to the school calendar include a plurality of monthly school calendars and the learning data related to each of the monthly school calendars include a plurality of daily schedules, a plurality of courses, a plurality of subject material files related to each of the courses and a content of each of the subject material file;

wherein when the category of the plurality of categories is the communication book, the learning data associated to the communication book include homework lists and messages, the learning data related to each of the homework lists include a plurality of homework files and the learning data related to each of the messages include content of the message; and wherein when the category of the plurality of categories is the course table, the learning data associated to the course table include a plurality of weekly course tables and the learning data related to each of the weekly course tables include a plurality of courses, a plurality of subject material files related to each of the courses and a content of each of the subject material file.

2. The integration method of claim 1, wherein the step of synchronizing the integrated database with the school database further comprises:

according to the identification of the individual, retrieving a plurality of school data corresponding to the individual from the school database; and updating the learning data in the integrated database with the retrieved school data.

3. The integration method of claim 1, wherein the step of displaying the operative frame further comprises, according to a current time, displaying the learning data corresponding to the current time at the main displaying region of the operative frame.

4. The integration method of claim 1, wherein the operative frame further has at least a tool icon representing an available application and when the first signal is for selecting one of the tool icon, the available application corresponding to the selected tool icon is launched.

5. A schoolbag integrated with an electronic device, comprising: a display, displaying an operative frame having a plurality of icons representing a plurality of categories respectively; a storage device storing an integrated database and a computer readable and writable program, wherein the integrated database stores a plurality of learning data corresponding to an individual, each of the learning data is associated to at least one of the categories and a portion of the learning data are related to one another; a processing unit, coupled to the display and the storage device and executing a plurality of instructions of the computer readable and writable program, wherein the instructions comprise: controlling the display to display a first set of learning data associated to one of the categories at a main displaying region of the operative frame; receiving a first signal in response to selecting one of the icons of the operative frame by the receiver of the schoolbag; when the first signal is for selecting one of the icons representing another one category, controlling the display to switch the operative frame for displaying the first set of learning data to another operative frame for displaying a second set of learning data associated to said another one category at the main displaying region of said another operative frame; and when the first signal is for selecting one datum among the displayed first set of learning data, controlling the display to display a third set of learning data at the main displaying region of the operative frame, wherein the third set of learning data is related to the selected datum, wherein before the instruction of controlling the display to display the first set of learning data, the instructions further comprise: connecting to a management server through Internet and logging in the management server with an identification of the individual, wherein the management server has a school database; automatically synchronizing the integrated database of the schoolbag with the school database according to the identification of the individual; when there is no learning data in the integrated database, downloading a plurality of school data corresponding to the individual from the school database according to the identification of the individual into the integrated database; analyzing the downloaded school data so as to associate each of the downloaded school data to at least one of the categories and so as to determine an operation connection between a portion of the downloaded school data and another portion of the downloaded school data; and controlling the display to display the operative frames wherein the learning data of the first set of learning data associated to one of sub-categories of the one of the categories has an operation connection with the learning data of the second set of learning data associated to one of sub-categories of said another one category;

wherein the categories include a school calendar, a course table, a communication book and a subject;

wherein when the category of the plurality of categories is the subject, the learning data associated to the subject include a plurality of subject material files and the learning data related to each of the subject material files include content of the subject material file;

wherein when the category of the plurality of categories is the school calendar, the learning data associated to the school calendar include a plurality of monthly school calendars and the learning data related to each of the monthly school calendars include a plurality of daily schedules, a plurality of courses, a plurality of subject material files related to each of the courses and a content of each of the subject material file;

wherein when the category of the plurality of categories is the communication book, the learning data associated to the communication book include homework lists and messages, the learning data related to each of the homework lists include a plurality of homework files and the learning data related to each of the messages include content of the message; and wherein when the category of the plurality of categories is the course table, the learning data associated to the course table include a plurality of weekly course tables and the learning data related to each of the weekly course tables include a plurality of courses, a plurality of subject material files related to each of the courses and a content of each of the subject material file.

6. The electronic device of claim 5, wherein the instruction of synchronizing the integrated database with the school database further comprises:

according to the identification of the individual, retrieving a plurality of school data corresponding to the individual from the school database; and updating the learning data in the integrated database with the retrieved school data.

7. The electronic device of claim 5, wherein the instruction of controlling the display to display the operative frame further comprises, according to a current time, controlling the display to display the learning data corresponding to the current time at the main displaying region of the operative frame.

8. The electronic device of claim 5, wherein the operative frame further has at least a tool icon representing an available application and when the first signal is for selecting one of the tool icon, the instructions further comprise launching the available application corresponding to the selected tool icon.

9. A learning system, comprising: a management server, having a school database storing a plurality of school data; at least a schoolbag integrated with an electronic device, wherein each of the schoolbags comprises: a display module displaying an operative frame having a plurality of icons representing a plurality of categories respectively and displaying a first set of learning data associated to one of the categories at a main displaying region of the operative frame; a data module, maintaining an integrated database stored in a storage device, wherein the integrated database stores a plurality of learning data corresponding to an individual, each of the learning data is associated to at least one of the categories and a portion of the learning data are related to one another; a control module coupled to the display module and the data module, wherein the control module receives a first signal through a receiver in response to selecting one of the icons of the operative frame by the schoolbag, and when the first signal is for selecting one of the icons representing another one category, the control module controls the display module to switch the operative frame for displaying the first set of learning data to another operative frame for displaying a second set of learning data associated to said another one category at the main displaying region of said another operative frame; and when the first signal is for selecting one datum among the displayed first set of learning data, the control module controls the display module to display a third set of learning data at the main displaying region of the operative frame, wherein the third set of learning data is related to the selected datum, wherein for each of the schoolbag, the control module connects to the management server through Internet, logs in the management server with an identification of the individual, and the control module controls the data module to automatically synchronize the integrated database in the data module of the schoolbag with the school database according to the identification of the individual and controls the display module to display the operative frame, when there is no learning data in the integrated database, the control module downloads a plurality of school data corresponding to the individual from the school database according to the identification of the individual into the integrated database, the data module analyzes the downloaded school data so as to associate each of the downloaded school data to at least one of the categories and so as to determine an operation connection between a portion of the downloaded school data and another portion of the downloaded school data, and the control module controls the display module to display the operative frame, wherein the learning data of the first set of learning data associated to one of sub-categories of the one of the categories has an operation connection with the learning data of the second set of learning data associated to one of sub-categories of said another one category;

wherein the categories include a school calendar, a course table, a communication book and a subject;

wherein when the category of the plurality of categories is the subject, the learning data associated to the subject include a plurality of subject material files and the learning data related to each of the subject material files include content of the subject material file;

wherein when the category of the plurality of categories is the school calendar, the learning data associated to the school calendar include a plurality of monthly school calendars and the learning data related to each of the monthly school calendars include a plurality of daily schedules, a plurality of courses, a plurality of subject material files related to each of the courses and a content of each of the subject material file;

wherein when the category of the plurality of categories is the communication book, the learning data associated to the communication book include homework lists and messages, the learning data related to each of the homework lists include a plurality of homework files and the learning data related to each of the messages include content of the message; and wherein when the category of the plurality of categories is the course table, the learning data associated to the course table include a plurality of weekly course tables and the learning data related to each of the weekly course tables include a plurality of courses, a plurality of subject material files related to each of the courses and a content of each of the subject material file.

10. The learning system of claim 9, wherein, for each of the electronic device, the data module synchronizing the integrated database of the electronic device with the school database further comprises:

according to the identification of the individual, the control module retrieving a plurality of school data corresponding to the individual from the school database; and the data module updating the learning data in the integrated database with the retrieved school data.

11. The learning system of claim 9, wherein the control module controlling the display module to display the operative frame further comprises, according to a current time, controlling the display module to display the learning data corresponding to the current time at the main displaying region of the operative frame.

12. The learning system of claim 9, wherein the operative frame further has at least a tool icon representing an available application and when the first signal is for selecting one of the tool icon, the control module launches the available application corresponding to the selected tool icon.

\* \* \* \* \*